(12) United States Patent
Clark et al.

(10) Patent No.: US 6,584,686 B1
(45) Date of Patent: Jul. 1, 2003

(54) METHOD FOR CONVERTING THE CONFIGURATION OF A TRANSMISSION PUMP ASSEMBLY

(76) Inventors: James Clark, 751 Bettes Ave., Akron, OH (US) 44310; Russell E. Shreve, 50 N. Rose Blvd., Akron, OH (US) 44302

( * ) Notice: Subject to any disclaimer, the term of this patent is extended or adjusted under 35 U.S.C. 154(b) by 0 days.

(21) Appl. No.: 10/068,817

(22) Filed: Feb. 6, 2002

(51) Int. Cl.[7] ............................................... B23P 15/00
(52) U.S. Cl. .......................... 29/888.011; 29/888.021; 29/401.1; 29/402.06
(58) Field of Search .................... 29/888.011, 888.021, 29/401.1, 402.04, 402.05, 402.06, 557

(56) References Cited

U.S. PATENT DOCUMENTS

| | | | | |
|---|---|---|---|---|
| 3,604,098 A | * | 9/1971 | Goldberg | 29/888.021 |
| 4,547,941 A | * | 10/1985 | Meier | 29/888.021 |
| 4,662,046 A | * | 5/1987 | Stephan | 29/888.012 |
| 4,692,977 A | * | 9/1987 | Maze | 29/889.5 |
| 6,332,257 B1 | * | 12/2001 | Reed et al. | 29/401.1 |

* cited by examiner

Primary Examiner—I Cuda Rosenbaum
(74) Attorney, Agent, or Firm—Hahn Loeser & Parks, LLP; Robert J. Clark

(57) ABSTRACT

The present invention provides an inexpensive and easily produced method for refurbishing transmission pump assemblies. The method of converting a transmission pump assembly from a first configuration to a second configuration comprises the steps of: a) providing a first configuration transmission pump assembly comprising a pump body and a pump cover, wherein the pump body and the pump cover each have a plurality of fluid passageways formed between worm tracks on at least one side thereof; b) removing a portion of the worm tracks from both the pump body and the pump cover; c) providing at least one insert; d) attaching the at least one insert into a predetermined position; and e) machining the pump cover and pump body to the second configuration.

20 Claims, 12 Drawing Sheets

F I G. I

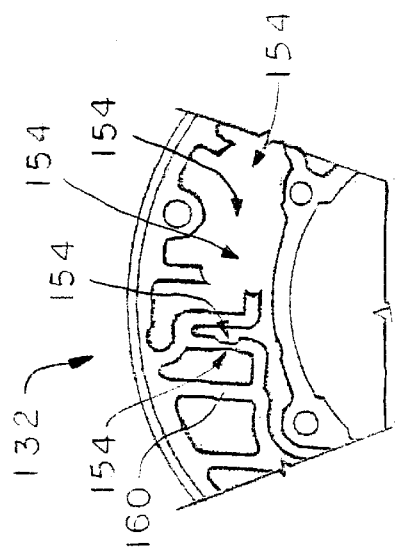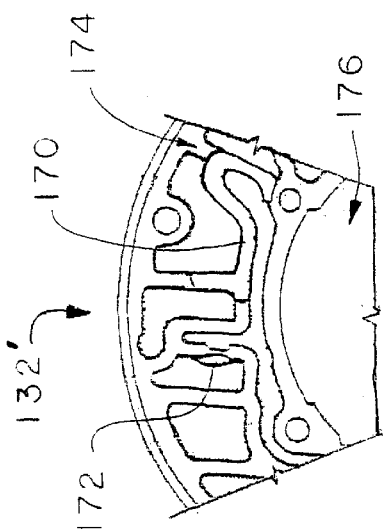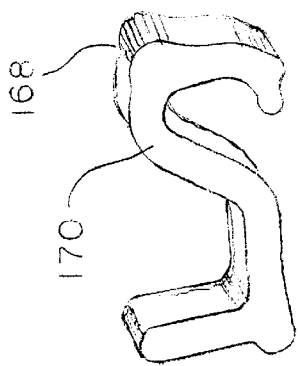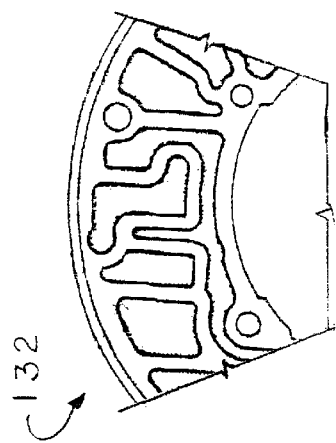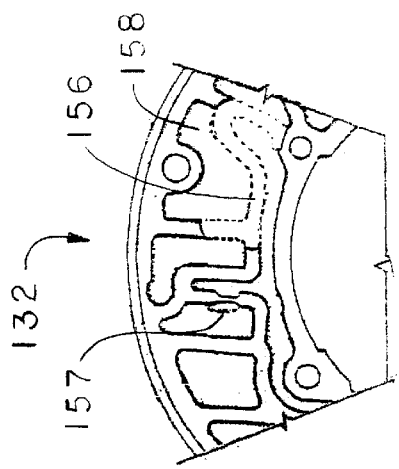

METHOD FOR CONVERTING THE CONFIGURATION OF A TRANSMISSION PUMP ASSEMBLY

TECHNICAL FIELD

The invention relates generally to a method of converting the configuration of a transmission pump into a later model year configuration transmission pump assembly. More specifically the invention relates to a method of converting a 1984–1994 General Motors 700 R4 transmission pump assembly into a 1995 or later configuration General Motors transmission pump assembly allowing a low cost replacement transmission pump.

BACKGROUND OF THE INVENTION

An automotive transmission multiplies engine torque or reduces engine rpm to match varying operating conditions in a manner optimizing engine power and torque. An automatic transmission generally comprises a torque converter, automatic transmission shafts, planetary gearsets providing different gear ratios, planetary holding members or clutches, transmission fluid pump, transmission shafts, hydraulic valves, shift linkage, converter housing, transmission case, transmission fluid pan, and an extension housing.

The automatic transmission is generally operated by a hydraulic fluid circuit. Pressure is developed by the transmission fluid pump, sometimes called an oil pump or front pump. The pump draws fluid from the transmission fluid pan and creates hydraulic pressure, which is then directed to other parts of the transmission to fill the torque converter, operate the holding member band and clutch assemblies, control shifting, lubricate the moving parts of the transmission, and circulate the fluid to and from an oil cooler for heat transfer. The pump is driven by the engine typically through driving lugs on the torque converter. When the engine is running, the pump produces power to operate the hydraulic system.

General Motors introduced a second generation transmission pump on its model 700 R4 transmission assembly in model year 1984 that remained basically unchanged through model year 1994. The 700 R4, (also designated 4L60E) utilizes a C-Vane type transmission oil pump comprising a pump body, a pump vane assembly, and a pump cover assembly. The 700 R4 transmission has been modified several times over the years. Some of these changes directly affected the compatibility of the transmission pumps between different model years.

When a transmission pump fails and needs to be replaced, the vehicle owner typically has a new or remanufactured transmission pump installed. New transmission pumps direct from the original equipment manufacturer (OEM) can be quite expensive. Significant cost savings can be obtained by using a remanufactured part. For example, a salvaged and remanufactured transmission pump from a 1984 model year 700-R4 transmission could be used for the same transmission for 1984–1994 model years. As these are older cars and cover over ten years of production, the number of salvageable transmission pumps are plentiful and comparatively low cost. However due to later model year changes in the transmission, the same pump could not be used for the same transmission of a 1995 model year. The limited number of salvaged transmission pumps from a transmission pump having a run of one or two years makes it virtually impossible to get a remanufactured part, thereby forcing the consumer to pay for a new OEM transmission pump.

Therefore, there remains a need in the art for a method of converting an older version of the transmission pump into a configuration compatible with later model year transmission pumps.

SUMMARY OF THE INVENTION

An object of the present invention is to provide an inexpensive and easily produced method for refurbishing transmission pump assemblies for later model year transmissions. These and other advantages are provided by a method of changing the configuration of a transmission pump assembly from a first configuration to a second configuration, the method comprising the following steps: a) providing a first configuration transmission pump assembly comprising a pump body and a pump cover, wherein the pump body and the pump cover each have a plurality of fluid passageways formed between worm tracks on at least one side thereof; b) removing a portion of the worm tracks from both the pump body and the pump cover; c) providing at least one insert; d) attaching the at least one insert into a predetermined position; and e) machining the pump cover and pump body to the second configuration.

BRIEF DESCRIPTION OF THE DRAWINGS

The invention and developments thereof are described in more detail in the following by way of embodiments with reference to the drawings, in which:

FIG. 9 is a plan view of a portion of the worm track side of an unmodified pump body;

FIG. 10 is a plan view of the pump body shown in FIG. 9 having portions of the worm track removed;

FIG. 11 is a plan view of the pump body shown in FIG. 10 having grooves machined into the floor of the pump body;

FIG. 12 is a plan view of the pump body shown in FIG. 11 having inserts attached to change the worm tracks to the modified configuration;

FIG. 13 is a perspective view of the cast insert shown in FIG. 12;

DETAILED DESCRIPTION OF THE INVENTION

Figure 1:
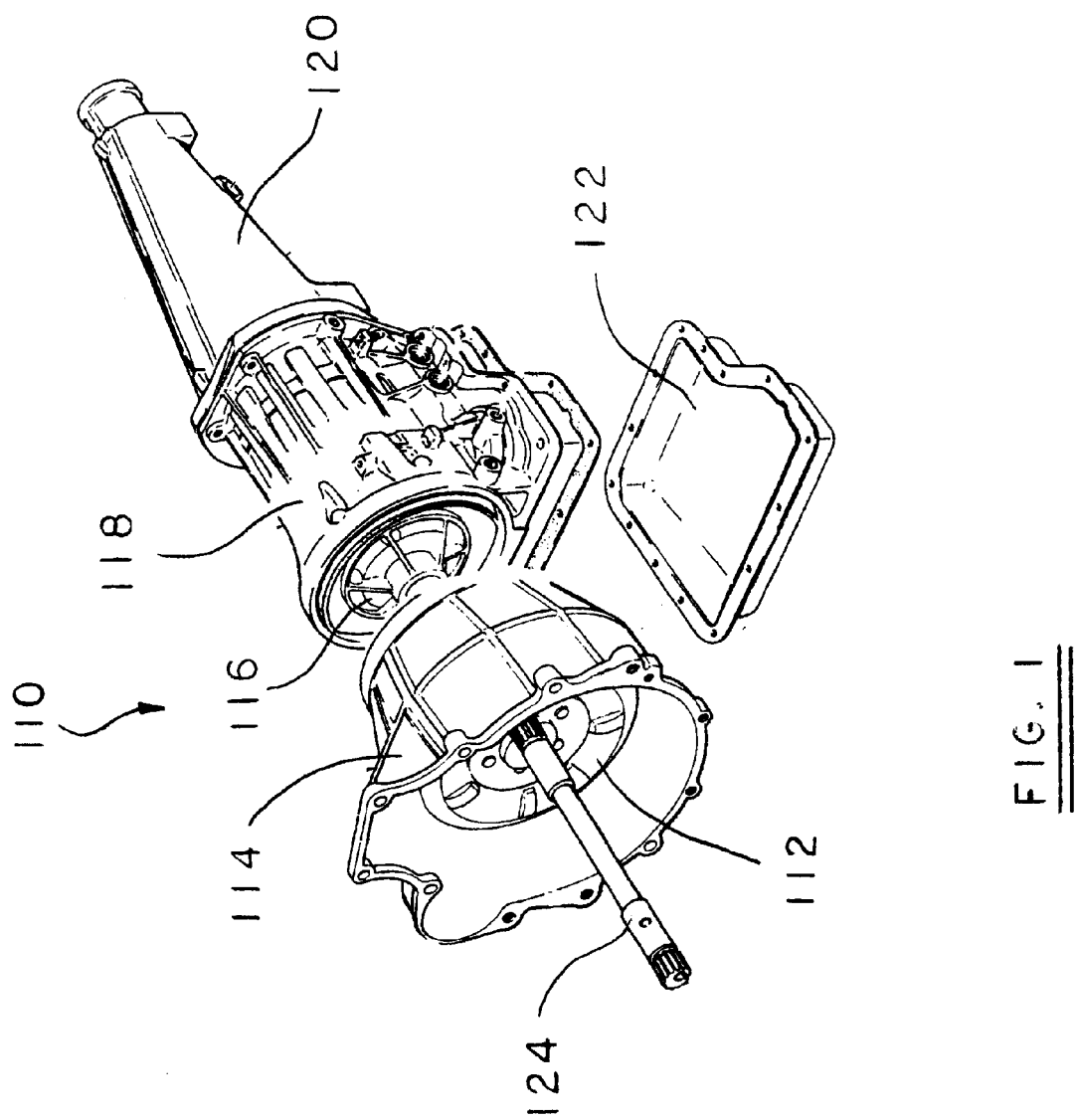
FIG. 1 is an exploded perspective view of a typical automatic transmission showing the relative positions of the torque converter and fluid pump.

FIG. 1 illustrates a partial exploded view of a typical automatic transmission assembly 110. The torque converter 112 is housed in a converter housing 114. Fluid pump assembly 116 is housed within a transmission case 118. Extension housing 120 is attached to an end of the transmission case 118 opposite the converter housing 114. Fluid pan 122 is attached to the bottom of transmission case 118. The transmission assembly 110 also comprises a input shaft 124 which is driven by the engine (not shown).

Figure 2:
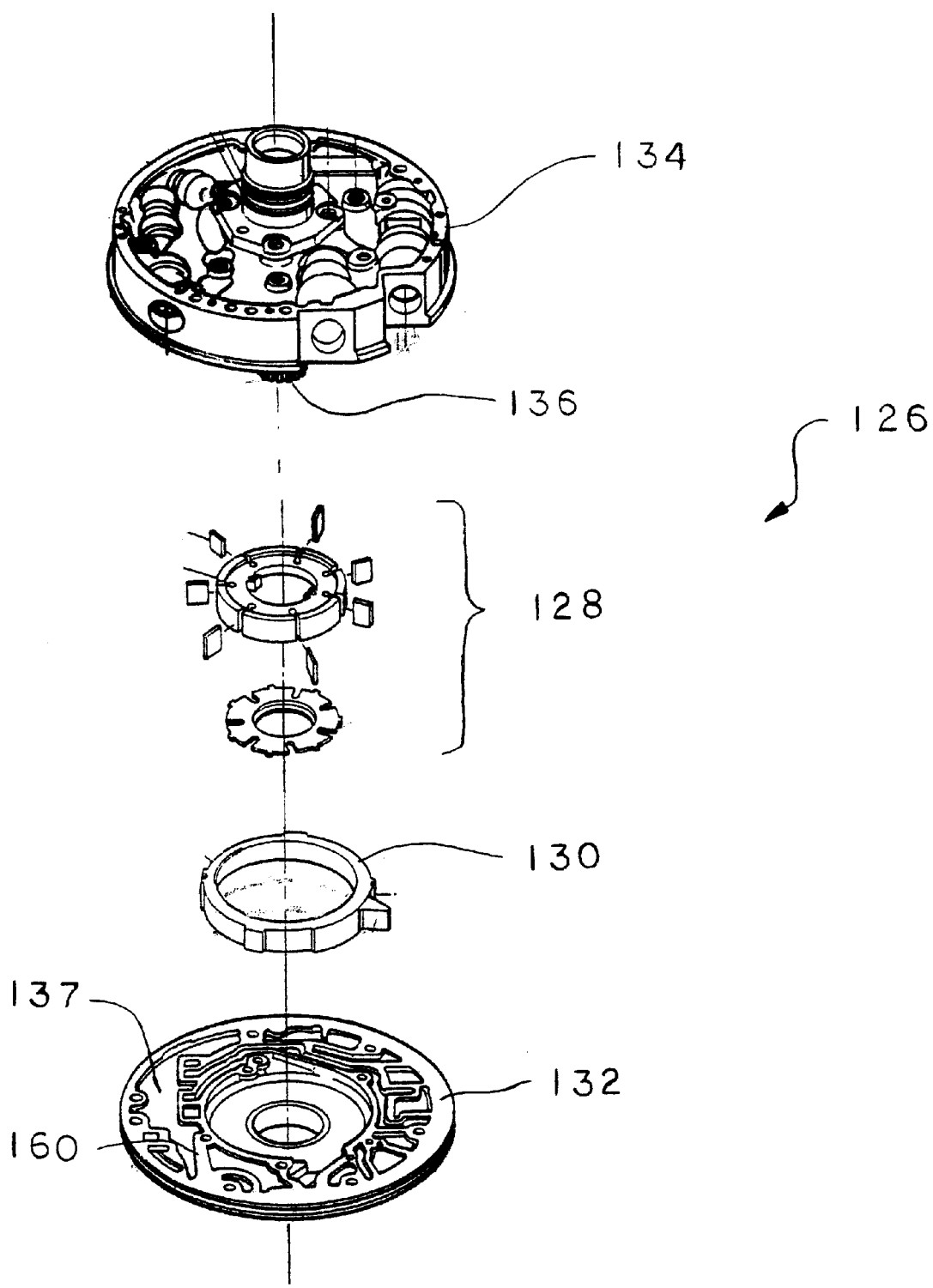
FIG. 2 is an exploded perspective view of a typical vane type fluid pump assembly.

Referring now to FIG. 2, a typical 1984 and on C-vane type fluid pump assembly 126 as used in a GM 700-R4 transmission is shown in an exploded perspective view. The major components of the fluid pump assembly 126 are the pump vane rotor assembly 128, pump slide 130, pump body 132, pump stator, or cover 134, and stator shaft 136, shown herein attached to pump cover 134. The pump body 132 and pump cover 134 each have corresponding fluid passageways 137 also referred to as worm grooves, separated from each other by passageway walls 160, or worm tracks. Some of the passageways 137 have holes designed for fluid passage which allow fluid flow in a particular direction or that can open or close on demand. It is noted that the configuration shown is a 7-vane fluid pump. The number of vanes was increased to 10 staggered vanes in the 1986 model year, and then 13 vanes in 1997 model year.

Figure 4:
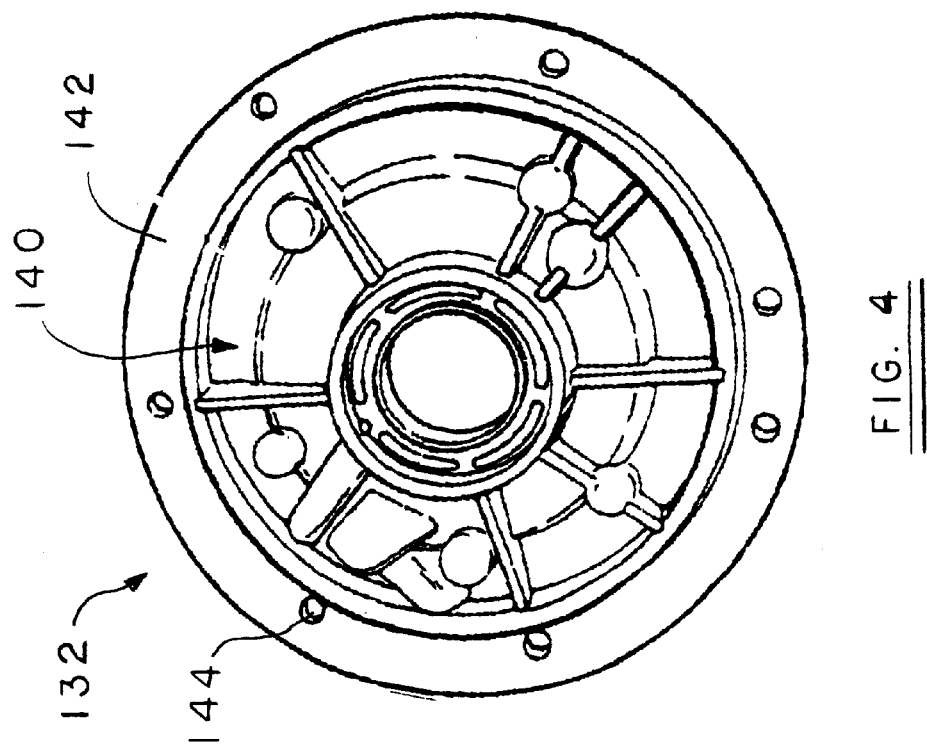
FIG. 4 is a perspective view of the front side of an unmodified pump body.
Figure 3:
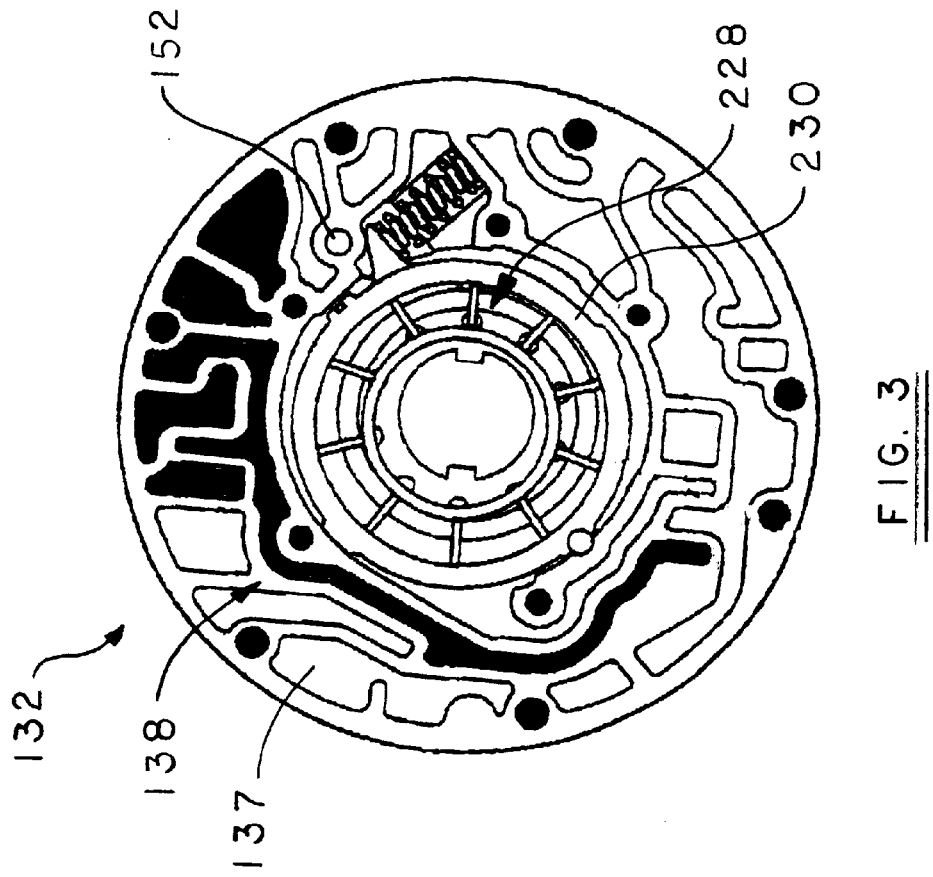
FIG. 3 is a plan view of the worm track side of an unmodified pump body.

Pump body 132 is shown in FIGS. 3 and 4, with FIG. 3 showing a plan view of the worm track side 138 of pump body 132 and FIG. 4 showing a perspective view of the front side 140 of the pump body 132. A 10 vane rotor assembly 228 and associated pump slide 230 are shown mounted in the central recess of the worm track side 138 of pump body 132. A seal drain passageway 152 is also partially shown as it is contiguous through the side of the pump body (not shown). A mounting register face 142 is shown machined into the radial outward portion of the front side 140 of the pump body 132. Mounting bolt holes 144 are positioned about the mounting face 142.

Figure 6:
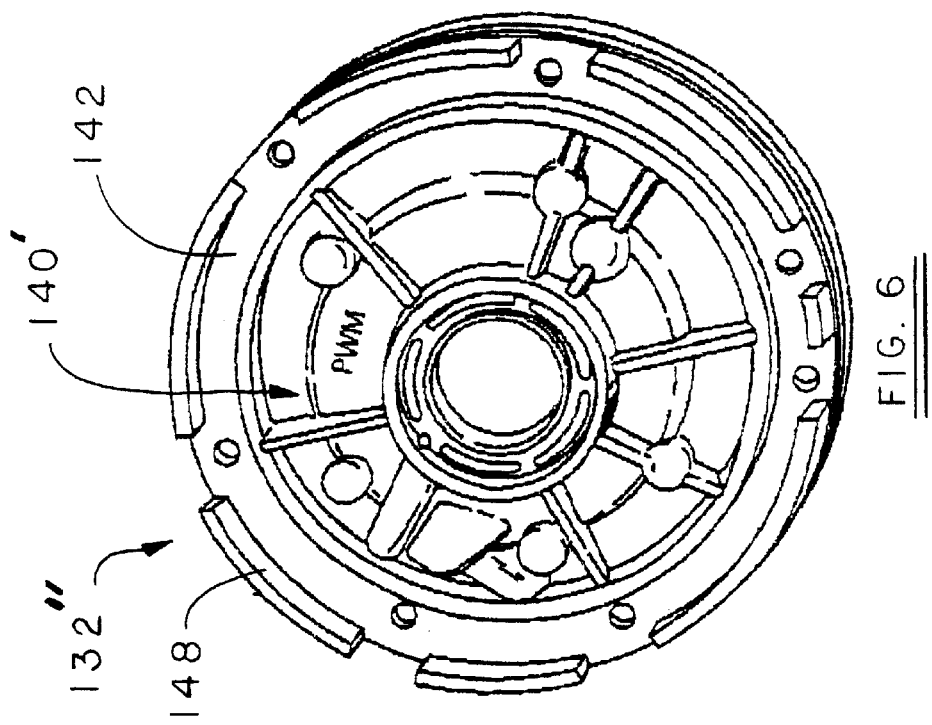
FIG. 6 is a perspective view of the front side of a modified pump body.
Figure 5:
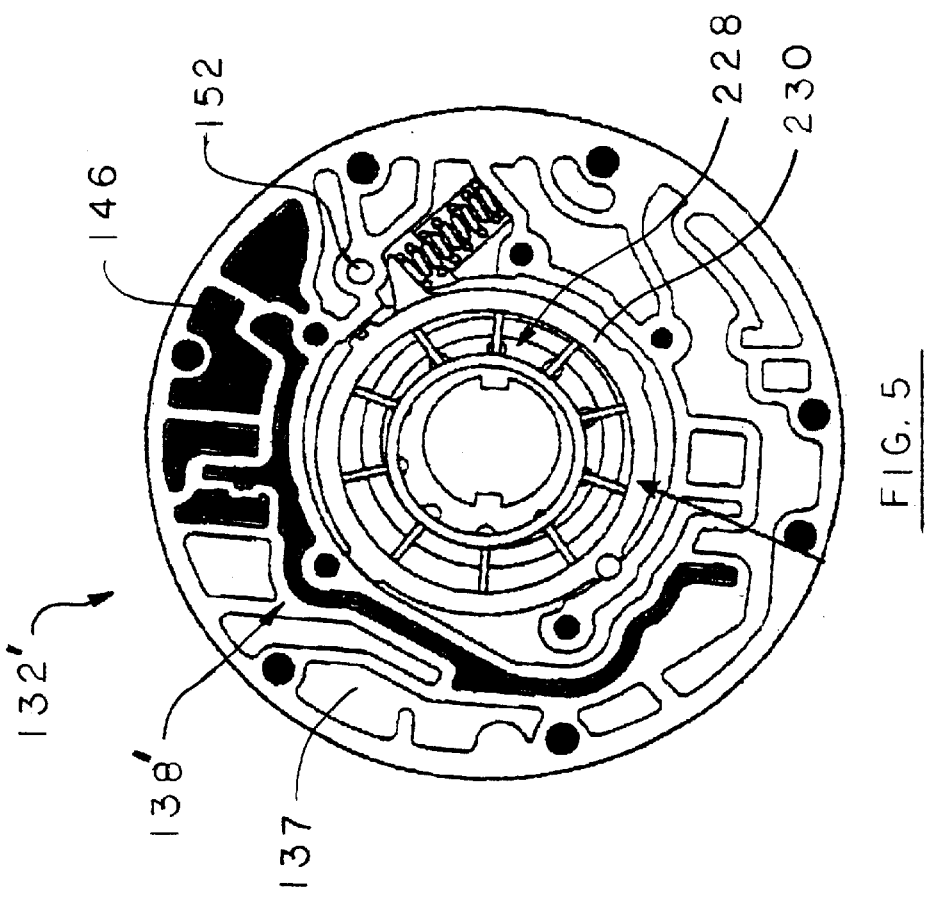
FIG. 5 is a plan view of the worm track side of a modified pump body.

As previously mentioned, a series of changes were made to the fluid pump assembly 126 starting with the 1995 model year. These changes primarily involved changes to the configuration of the fluid passageways 137 to incorporate pulse width modulation. These changes were intended to help the transmission 110 run more smoothly and eliminate pressure spikes from the transmission pump assembly. Referring now to FIG. 5, a plan view of the worm track side 138' of a 1995 and on model year configuration pump body 132' is shown. The fluid passageways 137 that are modified are highlighted by being shown as darkened areas 146. In addition, the seal drain passageway 152 was enlarged to improve fluid flow. Changes in the 1996 model year involved primarily the addition of risers on the torque converter side of the pump body. Referring now to FIG. 6, a perspective view of the front side 140' of a 1996 and on model year configuration pump body 132" is shown. Risers 148 are positioned about the circumference of register face 142'. The risers 148 were added to center the pump assembly 116 in the bell housing (not shown).

Figure 8:
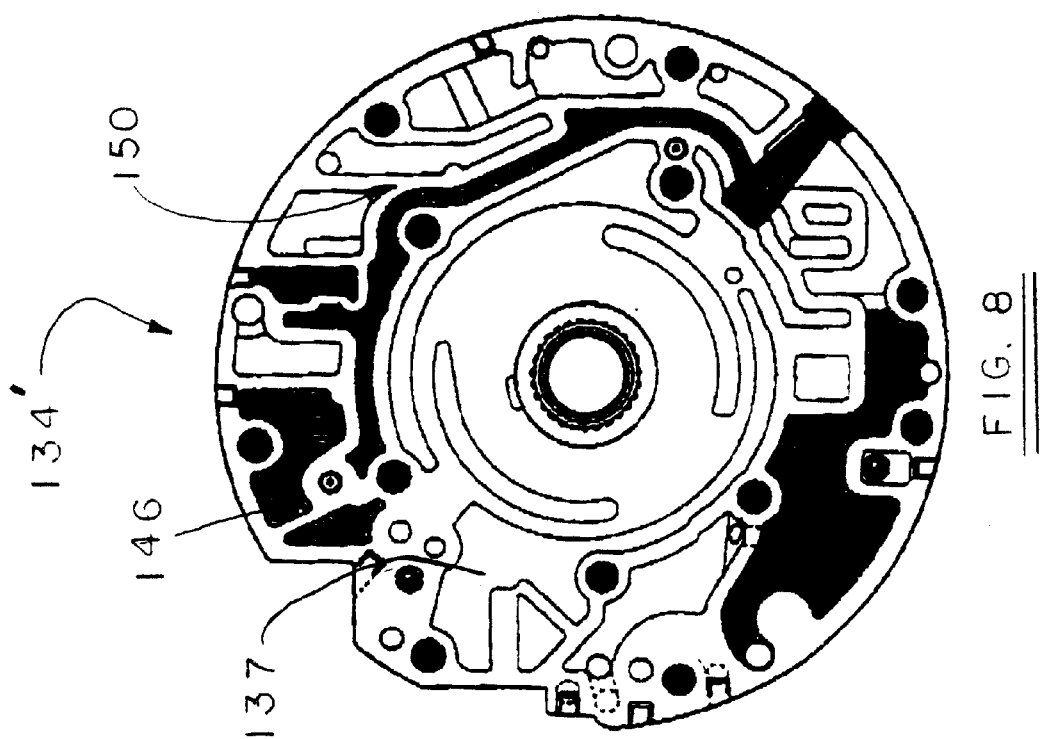
FIG. 8 is a plan view of the worm track side of a modified pump cover.
Figure 7:
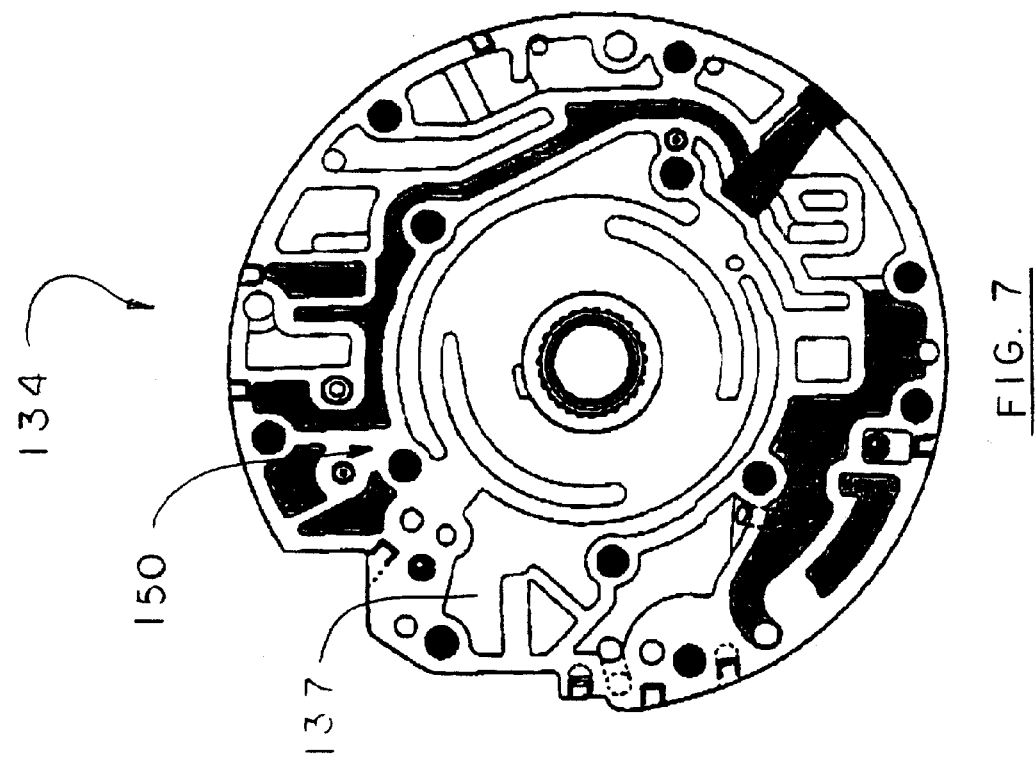
FIG. 7 is a plan view of the worm track side of an unmodified pump cover.
Figure 14:
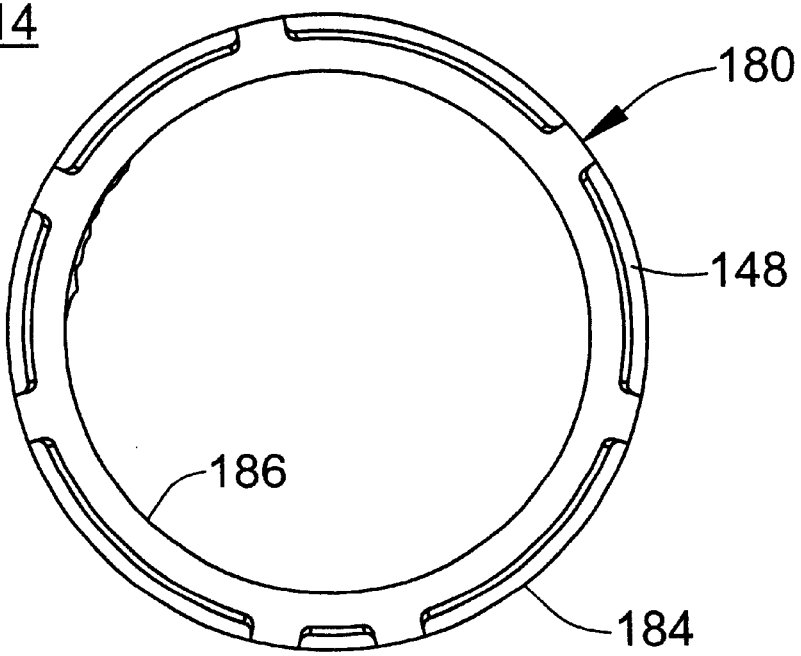
FIG. 14 is a plan view of a riser ring casting.
Figure 15:
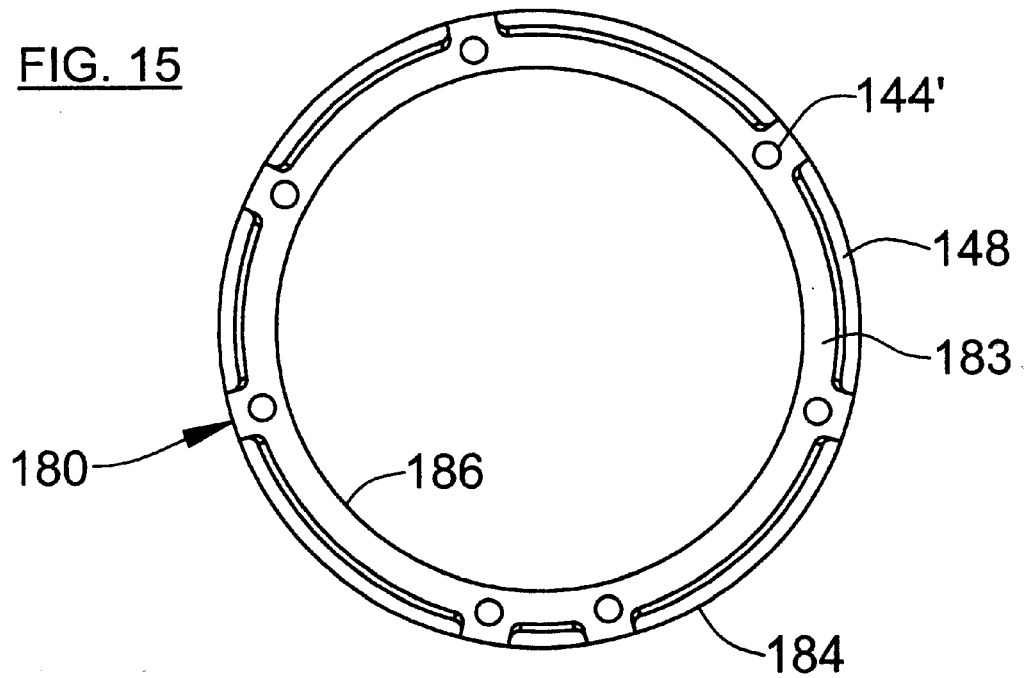
FIG. 15 is a plan view of a riser ring.

Referring now to FIG. 7, a plan view of the worm track side 150 of an unmodified pump cover 134 is shown. The fluid passageways 137 of the pump cover were also modified in the 1996 model year. A plan view of the worm track side 150' of a modified pump cover 134' is shown in FIG. 8. The fluid passageways 137 that are modified are highlighted by being shown as darkened areas 146.

Figure 21A:
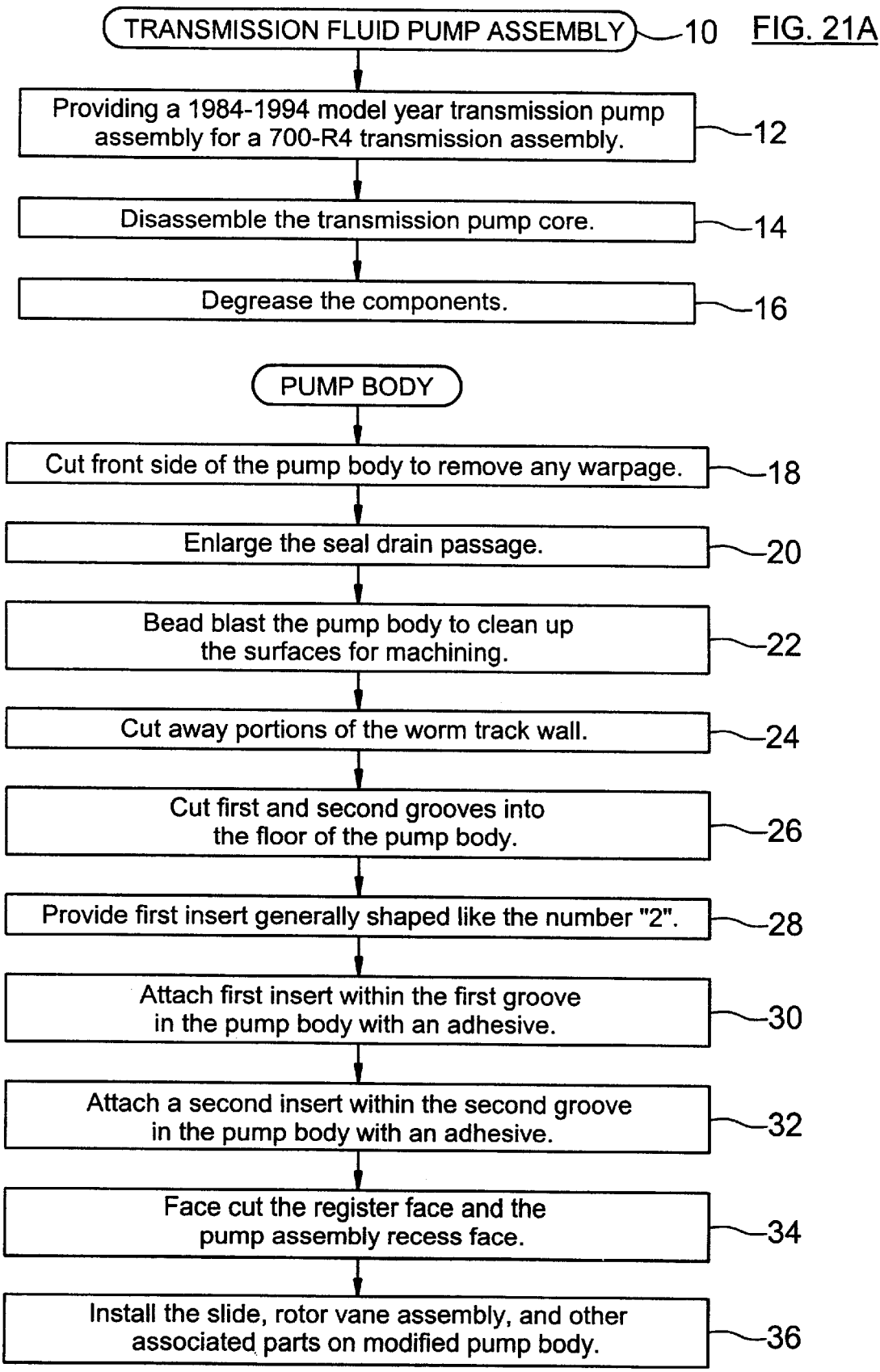
FIG. 21 is a listing of the steps of the method of the present invention.
Figure 21B:
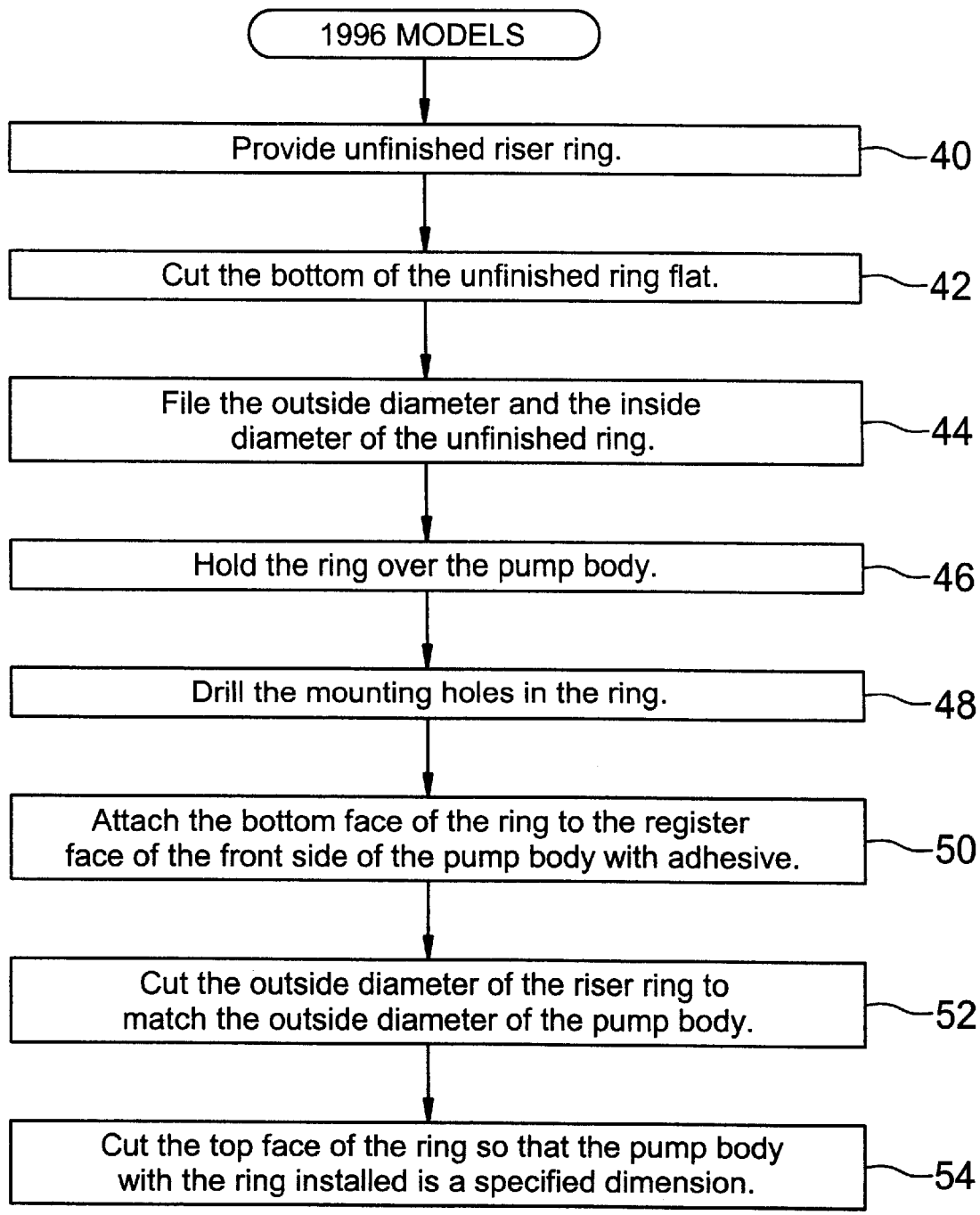
Figure 21C:
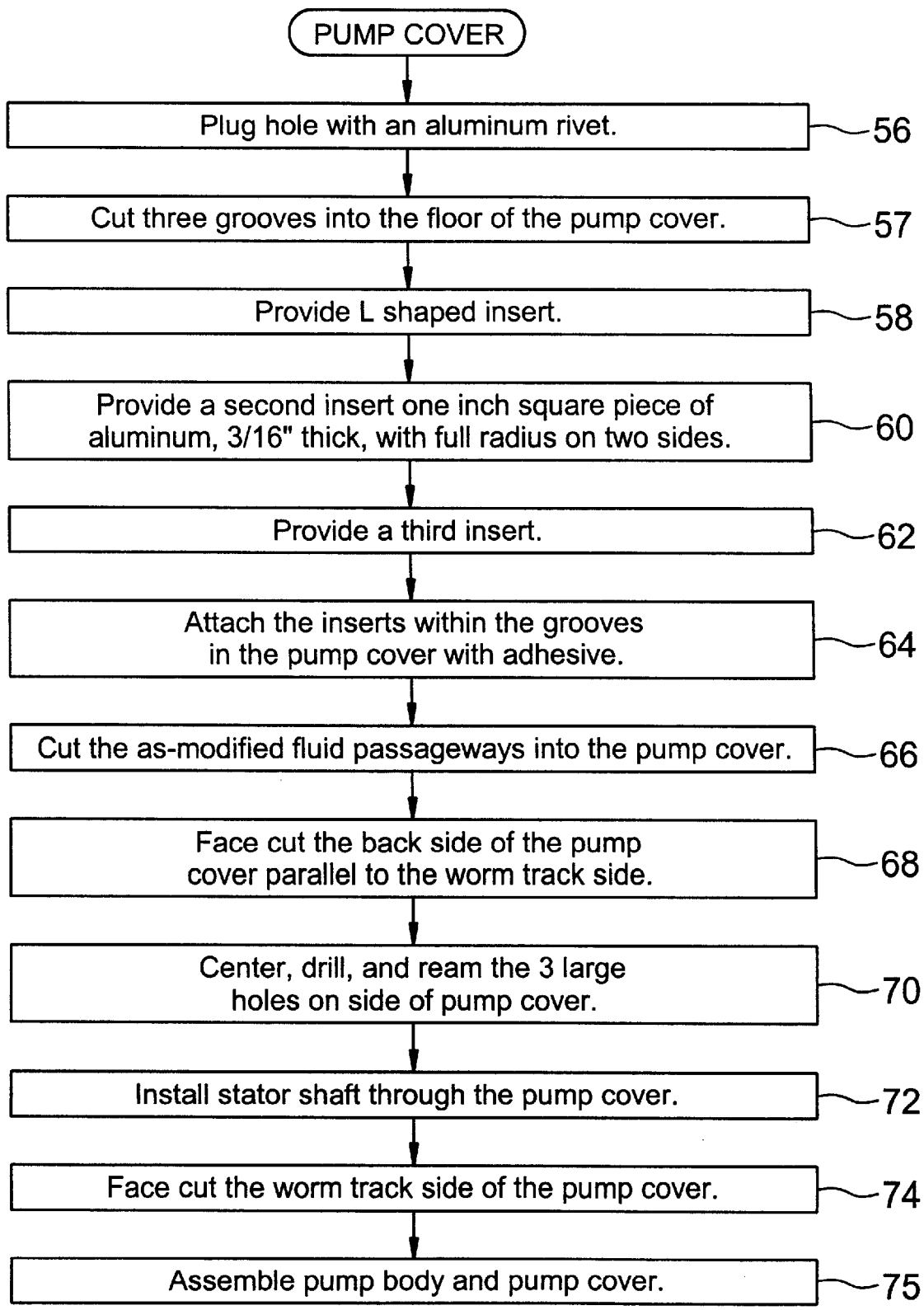

The method 10 of converting the configuration of a transmission fluid pump assembly 116 in accordance with the present invention will now be described in detail and are listed for reference in FIG. 21. The initial step is providing 12 a 1984–1994 model year transmission pump assembly 116 for a 700-R4 transmission assembly 110. While a new OEM pump assembly 116 could be used, it is more economical to use a salvaged used pump assembly 116.

The next step is to disassemble 14 the used, transmission pump core 116 into its three major components, the pump body 132, pump cover 134, and stator shaft 136. The components are then degreased 16. The modification of the pump body 132 is described next.

Transmission pumps are subjected to significant heat/cooling cycles during their operation and a used pump 126 may be slightly warped. Accordingly, the mounting register face 142 of the front side 140 of the pump body 132 is cut 18 on a lathe to remove any warpage due to service. The seal drain passage 152 is then machined 20 to enlarge the passageway 152 to the modified pump specifications. The pump body 132 is then bead-blasted 22 to clean up the surfaces for machining.

Referring now to FIGS. 9–13, the modification of the fluid passageways 137 is shown. FIG. 9 shows a partial plan view of a portion of an unmodified pump body 132. The pump body is then placed on a CNC mill and portions 154 of the worm track wall 160 are cut away 24 as best shown in FIG. 10. Special care is taken to the radius on the four sides created in the cavity. The next step is to cut 26 grooves 156, 157 into the floor 158 of the pump body 132 which corresponds to the localized changes to the worm track wall 160 of the 1995 model of the pump body 132'. The grooves 156, 157 are shown in dotted lines in FIG. 11 Referring now to FIGS. 12 and 13, insert 170 is created 28 to provide the new configuration of the worm track walls 160 and is generally shaped like the number "2". The insert is made as an aluminum casting, however, it is not intended to be limited as such and may be machined or formed by any suitable means. The insert 170 is secured 30 within the corresponding groove 156 by an industrial adhesive 168 which is applied to the bottom and sides of the insert 170. The industrial adhesive 168 may be any suitable adhesive which will permanently hold the insert 170, even when post machining work is being done on the insert. An additional piece of aluminum 172 is secured 32 with industrial adhesive 168 within groove 157 to duplicate a second modification to the worm track walls 160. The smaller insert 172 is typically oversize and then machined 34 (after the adhesive is dried) to its final dimensions to correspond with the specification of the modified pump body 132' as shown in FIG. 12.

After the adhesive is dried, the pump body 132' is placed on a lathe. The register face 174 and the pump assembly recess face 176 are cut 36 to a tolerance of plus or minus two tenthousandths (0.0002) of an inch. The slide 230, rotor vane assembly 228, and other associated parts are installed 36 on the pump body. The pump body is now configured as 1995 model year modified pump body 132' (see FIG. 5).

As previously discussed with relation to FIG. 6, the pump body 132' was modified in the 1996 model year. For 1996 and on model years, the method of conversion 10 further comprises the addition of a riser ring 180. The riser ring 180 is produced as follows. An aluminum ring 180 with risers 148 generally corresponding to the dimensions of the mounting register face 142 of the front side 140 of the pump body 132, is cast 40 in a mold (a ring could also be machined but would be more costly if a significant number of pumps are being remanufactured). The as-cast ring 180 is placed on a lathe and the bottom 182 of the ring 180 is cut 42 flat. The outside diameter 184 and the inside diameter 186 are hand filed 44 to assure that it fits in a fixture (not shown). The fixture is a device used to hold 46 the ring 180 under the pump body 132' in a manner that the bolt holes 144 in the pump body are used as guides to drill 48 the mounting holes 144' in the ring 180. Because these bolt holes 144 vary slightly from one pump to another, the pump body 132' used to drill the holes 144' is mated to the particular riser ring 180. Industrial adhesive 168 is placed on the bottom face 182 of the ring 180 and the bottom face 182 is attached 50 to the register face 142 of the front side 140 of the pump body 132 such that the mounting holes 144, 144' are properly aligned.

After the adhesive has dried, the pump body 132 is placed in another special set of jaws on the lathe. The outside diameter of the riser ring is cut 52 to match the outside diameter of the pump body. The top face 183 of the ring is then cut 54 so that the thickness of the pump body 132 with the ring installed meets the dimension specification of the modified pump body 132'.

Figure 17:
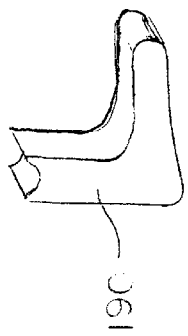
FIG. 17 is a perspective view of an insert.
Figure 19:
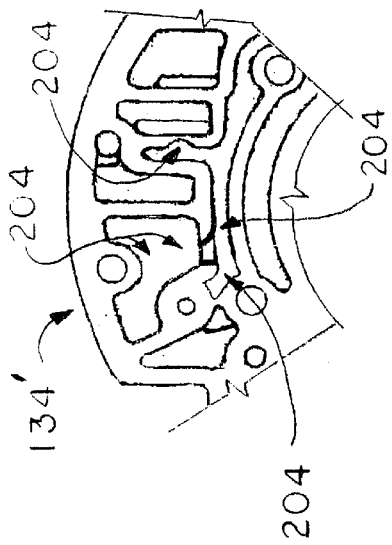
FIG. 19 is a plan view of the pump cover shown in FIG. 18 which is machined to its final configuration.
Figure 16:
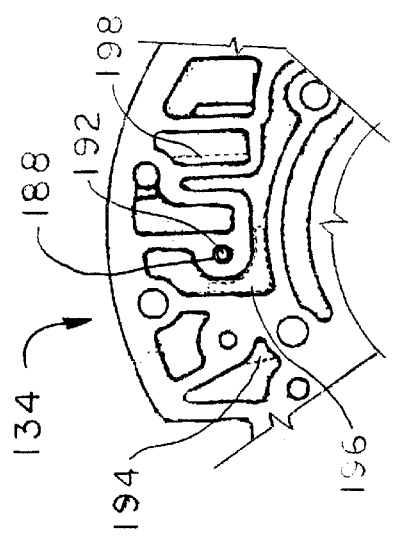
FIG. 16 is a plan view of the pump cover shown in FIG. 7 having grooves machined into the floor of the pump body.
Figure 18:
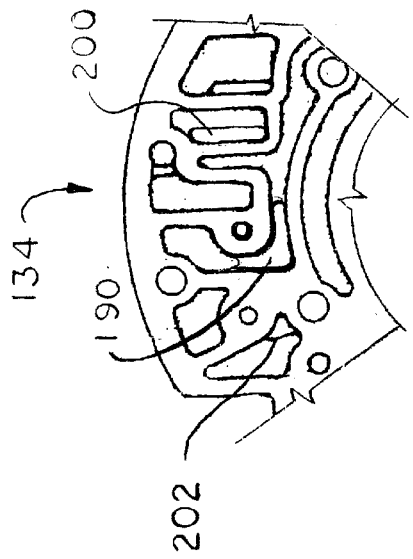
FIG. 18 is a plan view of the pump cover shown in FIG. 16 having three inserts attached.

Referring again to FIGS. 7 and 8, the pump cover 134 must also be modified in a similar manner as the pump body 132 to convert it to the modified pump cover 134' configuration. Referring now to FIGS. 16–20, the modification of the fluid passageways 137 on the pump cover 134 is shown. FIG. 16 shows a partial plan view of a portion of pump cover 134. Hole 188 is plugged 56 with an aluminum rivet 192. Grooves 194, 196, and 198 are cut 57 into the floor of the pump cover 134 to allow three inserts to be installed. Although not shown, portions of the worm groove walls may also be milled to allow additional room for installation of the inserts. Referring now to FIGS. 17 and 18, cast aluminum insert 190 is created 58 to provide portion of the new configuration of the worm track walls 160 and is generally shaped like the letter "L". A second insert 200 is provided 60 and machined as a one inch square piece of aluminum, ³⁄₁₆" thick, with full radius on two sides. A third insert 202 is also provided 62. The inserts 190, 200, 202 are attached 64 to the pump cover 134 with a suitable industrial adhesive. After the adhesive has dried sufficiently, the pump cover 134 is then milled 66 at locations 204 to the modified pump cover configuration 134' as shown in FIG. 19.

The pump cover 134' is placed in the lathe and the back side, the side opposite the worm track side 138, is cut 68 parallel to the worm track side 138.

Figure 20:
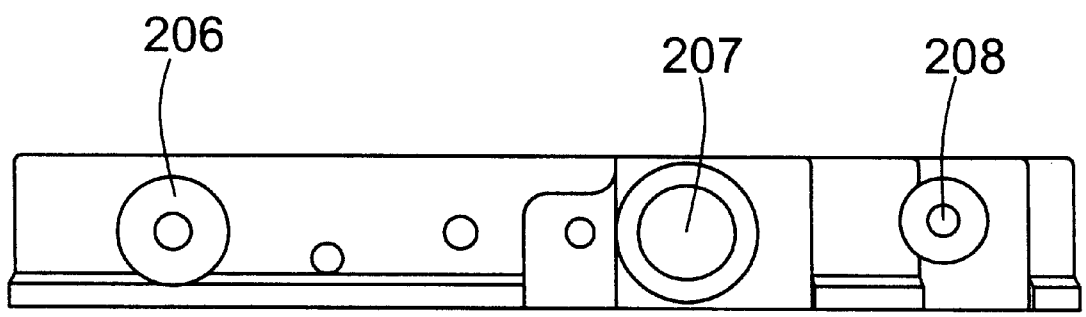
FIG. 20 is a side elevational view of the pump cover.

Referring now to FIG. 20, the three major holes 206, 207, 208 are centered, drilled, and reamed 70 to the larger hole specifications of the modified pump cover 134' to a tolerance of plus or minus 0.0002". The stator shaft 136 is then installed 72 through pump cover 134' and it is placed back on the lathe. The worm track side 138' of pump cover 134' is faced 74 and it is now ready for assembly 76 with pump body 132'.

Although not specifically discussed several additional holes are enlarged and/or plugged to finalize the conversion. These operations are omitted as they are common machining procedures understood by those in the art.

The present invention provides a method of conversion of a transmission pump without requiring any welding. It is contemplated that the inserts could be replaced by direct welding in the locations to be modified and then machined to the proper configuration. However, the welds sections may have problems with porosity that even peening of the weld areas may not solve. In addition, the high temperatures involved in the welding process may warp the pump cover and the pump body.

The present invention shows a particular transmission pump assembly used in a General Motors application. It is contemplated that the method of the present invention could easily be adapted to be used to convert other transmission pump assemblies that have been changed by the manufacturer under similar conditions.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A method of changing the configuration of a transmission pump assembly from a first configuration to a second configuration, the method comprising the following steps:
    a) providing a first configuration transmission pump assembly comprising a pump body and a pump cover, wherein the pump body and the pump cover each have a plurality of fluid passageways formed between worm tracks on at least one side thereof;
    b) removing a portion of the worm tracks from both the pump body and the pump cover;
    c) providing at least one insert;
    d) attaching the at least one insert into a predetermined position in at least one of the pump cover or the pump body; and
    e) machining the pump cover and pump body to the second configuration.

2. The method of claim 1 wherein the insert is attached using an adhesive.

3. The method of claim 1 further comprising the step of attaching a riser ring to the pump body.

4. The method of claim 1, wherein the first configuration transmission pump assembly is a 1984–1994 model year transmission pump assembly for a 700-R4 transmission.

5. The method of claim 1, wherein the second configuration is a 1995 model year transmission pump assembly for a 700-R4 transmission.

6. The method of claim 1, wherein the second configuration is a 1996 and newer model year transmission pump assembly for a 700-R4 transmission.

7. The method of claim 1, wherein at least one insert is attached to the pump body and at least one insert is attached to the pump cover.

8. The method of claim 7, wherein the at least one insert attached to the pump body is formed in the shape of the number "2".

9. The method of claim 1, wherein the at least one insert is made of aluminum.

10. The method of claim 1, wherein the at least one insert is cast in a mold.

11. A method of changing the configuration of a transmission pump body from a first configuration to a second configuration, the method comprising the following steps:
    a) providing a first configuration transmission pump body having a plurality of fluid passageways formed between worm tracks on at least one side thereof;
    b) removing a portion of the worm tracks;
    c) providing at least one insert;

d) attaching the at least one insert into a predetermined position on the pump body; and e) machining the fluid passageways of the pump body to the second configuration.

12. The method of claim 11, wherein the at least one insert is attached using an adhesive.

13. The method of claim 11 further comprising the step of attaching a riser ring to the pump body.

14. The method of claim 11, wherein the first configuration transmission pump body is a 1984–1994 model year transmission pump body for a 700-R4 transmission.

15. The method of claim 11, wherein the second configuration is a 1995 model year or newer transmission pump body for a 700-R4 transmission.

16. The method of claim 11, wherein the at least one insert attached to the pump body is formed in the shape of an "2".

17. A method of changing the configuration of a transmission pump cover from a first configuration to a second configuration, the method comprising the following steps:

a) providing a first configuration transmission pump cover having a plurality of fluid passageways formed between worm tracks on at least one side thereof;

b) removing a portion of the worm tracks;

c) providing at least one insert;

d) attaching the at least one insert into a predetermined position on the pump cover; and e) machining the fluid passageways of the pump cover to the second configuration.

18. The method of claim 17, wherein the first configuration transmission pump body is a 1984–1994 model year transmission pump cover for a 700-R4 transmission.

19. The method of claim 17, wherein the second configuration is a 1995 model year or newer transmission pump body for a 700-R4 transmission.

20. The method of claim 17, wherein the at least one insert attached to the pump body is formed in the shape of an "L".

* * * * *